(12) United States Patent
Weeks et al.

(10) Patent No.: US 11,964,346 B2
(45) Date of Patent: *Apr. 23, 2024

(54) DUAL WIRE WELDING OR ADDITIVE MANUFACTURING SYSTEM AND METHOD

(71) Applicant: Lincoln Global, Inc., Santa Fe Springs, CA (US)

(72) Inventors: Matthew A. Weeks, Walloon (AU); Steven R. Peters, Huntsburg, OH (US); Bruce J. Chantry, Solon, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 317 days.

This patent is subject to a terminal disclaimer.

(21) Appl. No.: 17/010,963

(22) Filed: Sep. 3, 2020

(65) Prior Publication Data
US 2020/0398364 A1   Dec. 24, 2020

Related U.S. Application Data

(63) Continuation of application No. 15/671,295, filed on Aug. 8, 2017, now Pat. No. 10,792,752.

(51) Int. Cl.
*B23K 9/00* (2006.01)
*B22F 10/20* (2021.01)
(Continued)

(52) U.S. Cl.
CPC ............ *B23K 9/0017* (2013.01); *B22F 10/20* (2021.01); *B22F 12/55* (2021.01); *B23K 9/04* (2013.01);
(Continued)

(58) Field of Classification Search
CPC .......... B22F 10/10; B22F 10/20; B22F 12/00; B22F 12/55; B22F 2999/00;
(Continued)

(56) References Cited

U.S. PATENT DOCUMENTS

| 1,368,287 A | 2/1921 | Pennington et al. |
| 1,605,860 A | 11/1926 | Snelling |

(Continued)

FOREIGN PATENT DOCUMENTS

| CN | 2683302 Y | 3/2005 |
| CN | 101745726 A | 6/2010 |

(Continued)

OTHER PUBLICATIONS

Extended European Search Report for Corresponding Application No. 21156359.8; dated Jul. 9, 2021; pp. 1-8.
(Continued)

*Primary Examiner* — Sang Y Paik
(74) *Attorney, Agent, or Firm* — Brad C. Spencer

(57) ABSTRACT

A system and method of welding or additive manufacturing is provided where at least two welding electrodes are provided to and passed through a two separate orifices on a single contact tip and a welding waveform is provided to the electrodes through the contact tip to weld simultaneously with both electrodes, where a bridge droplet is formed between the electrodes and then transferred to the puddle.

22 Claims, 8 Drawing Sheets

(51) Int. Cl.
  *B22F 12/55* (2021.01)
  *B23K 9/04* (2006.01)
  *B23K 9/09* (2006.01)
  *B23K 9/12* (2006.01)
  *B23K 9/173* (2006.01)
  *B23K 9/18* (2006.01)
  *B33Y 10/00* (2015.01)
  *C22C 1/05* (2023.01)
  *B22F 10/10* (2021.01)
  *B23K 26/14* (2014.01)
  *B23K 26/211* (2014.01)
  *B33Y 30/00* (2015.01)
  *G05B 19/4099* (2006.01)

(52) U.S. Cl.
  CPC ............. *B23K 9/092* (2013.01); *B23K 9/121* (2013.01); *B23K 9/123* (2013.01); *B23K 9/124* (2013.01); *B23K 9/1735* (2013.01); *B23K 9/188* (2013.01); *B33Y 10/00* (2014.12); *C22C 1/05* (2013.01); *B22F 10/10* (2021.01); *B22F 2999/00* (2013.01); *B23K 26/1423* (2013.01); *B23K 26/211* (2015.10); *B33Y 30/00* (2014.12); *G05B 19/4099* (2013.01)

(58) Field of Classification Search
  CPC ............. B23K 26/1423; B23K 26/211; B23K 9/0017; B23K 9/04; B23K 9/092; B23K 9/121; B23K 9/123; B23K 9/124; B23K 9/1735; B23K 9/188; B23K 11/257; B29C 64/10; B33Y 10/00; B33Y 30/00; C22C 1/05; C22C 29/06; G05B 19/4099
  USPC .................................................. 219/121.14
  See application file for complete search history.

(56) References Cited

U.S. PATENT DOCUMENTS

| | | |
|---|---|---|
| 2,583,507 A | 1/1952 | Carpenter et al. |
| 2,594,333 A | 4/1952 | Medicus |
| 2,756,311 A | 7/1956 | Persson et al. |
| 2,849,593 A | 8/1958 | Volff et al. |
| 2,866,079 A | 12/1958 | Morley |
| 2,911,517 A | 11/1959 | Armstrong |
| 2,957,101 A | 10/1960 | Barkley |
| 3,131,325 A | 4/1964 | Briggs |
| 3,274,371 A | 9/1966 | Saenger, Jr. |
| 3,328,556 A | 6/1967 | Nelson |
| 3,384,778 A | 5/1968 | Jeannette |
| 3,624,345 A | 11/1971 | Armstrong |
| 3,693,858 A | 9/1972 | Araya |
| 3,694,620 A | 9/1972 | Gleason |
| 3,746,833 A | 7/1973 | Ujiie |
| 3,933,533 A | 1/1976 | Uchida |
| 4,012,621 A | 3/1977 | Uchida |
| 4,088,866 A | 5/1978 | Lund et al. |
| 4,182,947 A | 1/1980 | Brower |
| 4,295,746 A | 10/1981 | Hartmann |
| 4,336,441 A | 6/1982 | Godai |
| 4,437,906 A | 3/1984 | Tateishi |
| 4,475,996 A | 10/1984 | Inoue |
| 4,541,616 A | 9/1985 | Dean |
| 4,697,791 A | 10/1987 | Henderson et al. |
| 4,743,731 A | 5/1988 | Seuring |
| 4,902,873 A | 2/1990 | Ivannikov |
| 4,968,867 A | 11/1990 | Banzai |
| 5,148,001 A | 9/1992 | Stava |
| 5,155,330 A * | 10/1992 | Fratiello ............. B23K 9/295 219/137 R |
| 5,324,552 A | 6/1994 | Opower |
| 5,440,100 A | 8/1995 | Stuart et al. |
| 5,491,321 A | 2/1996 | Stuart |
| 5,635,091 A | 6/1997 | Hori et al. |
| 5,714,735 A | 2/1998 | Offer |
| 5,782,987 A | 7/1998 | Furman |
| 5,791,560 A | 8/1998 | Rogers et al. |
| 5,816,466 A | 10/1998 | Seufer |
| 5,958,261 A | 9/1999 | Offer |
| 5,977,504 A | 11/1999 | Offer |
| 5,981,906 A | 11/1999 | Parker |
| 6,031,203 A * | 2/2000 | Suzuki ............. B23K 9/073 219/130.01 |
| 6,225,589 B1 | 5/2001 | Bartok |
| 6,172,333 B1 | 9/2001 | Stava |
| 6,374,655 B1 | 4/2002 | Hresc |
| 6,512,200 B2 | 1/2003 | Norrish et al. |
| 6,512,220 B1 | 1/2003 | Park |
| 6,627,839 B1 | 9/2003 | Luckowski |
| 6,683,271 B2 | 1/2004 | Rogers |
| 6,683,279 B1 | 1/2004 | Moerke |
| 6,737,616 B1 | 5/2004 | Sherrill |
| 7,112,759 B1 | 9/2006 | Severance, Jr. |
| 7,183,516 B2 | 2/2007 | Blankenship |
| 7,429,716 B2 | 9/2008 | Bong et al. |
| 7,495,192 B2 | 2/2009 | Takahashi |
| 7,525,067 B2 | 4/2009 | Diez |
| 7,705,269 B2 | 4/2010 | Daniel |
| 7,761,336 B1 | 7/2010 | Blankenship et al. |
| 7,777,447 B2 | 8/2010 | Vogel |
| 8,049,139 B2 | 11/2011 | Houston |
| 8,723,082 B2 | 5/2014 | Spiesberger |
| 9,186,745 B2 | 11/2015 | Jia et al. |
| 9,839,970 B2 | 12/2017 | Peters et al. |
| 9,862,056 B2 | 1/2018 | Berger et al. |
| 9,895,760 B2 | 2/2018 | Peters |
| 9,937,577 B2 | 4/2018 | Daniel et al. |
| 10,052,707 B2 | 8/2018 | Henry et al. |
| 10,792,752 B2 * | 10/2020 | Weeks ............. B23K 9/121 |
| 2001/0008235 A1 | 7/2001 | Miszczak et al. |
| 2003/0209530 A1 | 11/2003 | Stuart et al. |
| 2004/0016735 A1 | 1/2004 | Huismann et al. |
| 2005/0199673 A1 | 9/2005 | Enyedy |
| 2005/0218132 A1 | 10/2005 | Wells |
| 2005/0224486 A1 | 10/2005 | Matiash |
| 2005/0230373 A1 | 10/2005 | Kensrue |
| 2006/0070985 A1 | 4/2006 | Nakabayashi et al. |
| 2006/0081675 A1 | 4/2006 | Enyedy |
| 2006/0138115 A1 | 6/2006 | Norrish et al. |
| 2006/0226137 A1 | 10/2006 | Huismann et al. |
| 2006/0243704 A1 | 11/2006 | Matz et al. |
| 2007/0145028 A1 | 6/2007 | Artelsmair |
| 2007/0151964 A1 | 7/2007 | Artelsmair et al. |
| 2007/0158324 A1 | 7/2007 | O'Donnell et al. |
| 2007/0164074 A1 | 7/2007 | Schorghuber et al. |
| 2008/0128395 A1 | 6/2008 | Aigner et al. |
| 2008/0169336 A1 | 7/2008 | Spiegel et al. |
| 2008/0190900 A1 | 8/2008 | Zhang et al. |
| 2009/0050609 A1 | 2/2009 | Berger et al. |
| 2009/0234483 A1 | 9/2009 | Leko et al. |
| 2010/0213179 A1 | 8/2010 | Peters |
| 2010/0301030 A1 | 12/2010 | Zhang et al. |
| 2010/0314373 A1 | 12/2010 | Patterson |
| 2011/0171393 A1 | 7/2011 | Margolies et al. |
| 2011/0309062 A1 | 12/2011 | O'Donnell et al. |
| 2012/0067859 A1 | 3/2012 | Albrecht et al. |
| 2012/0074115 A1 | 3/2012 | Kazmaier et al. |
| 2012/0152921 A1 | 6/2012 | Peters et al. |
| 2012/0285938 A1 | 11/2012 | McFadden et al. |
| 2013/0193115 A1 | 8/2013 | Berg |
| 2013/0264323 A1 | 10/2013 | Daniel |
| 2014/0027413 A1 | 1/2014 | Lin et al. |
| 2014/0166633 A1 | 6/2014 | Albrecht |
| 2014/0197148 A1 | 7/2014 | Chen et al. |
| 2015/0209889 A1 | 7/2015 | Peters et al. |
| 2015/0283639 A1 * | 10/2015 | Henry ............. B23K 35/0294 219/130.51 |
| 2016/0228972 A1 | 8/2016 | Jogdand et al. |
| 2016/0368075 A1 | 12/2016 | Ide |
| 2017/0080511 A1 | 3/2017 | Jaeger et al. |
| 2017/0165779 A1 | 6/2017 | Barhorst et al. |
| 2017/0189982 A1 | 7/2017 | Hsu |
| 2017/0368629 A1 | 12/2017 | Grigorenko |

(56) References Cited

U.S. PATENT DOCUMENTS

| | | |
|---|---|---|
| 2018/0207744 A1 | 7/2018 | Stoecker |
| 2018/0214966 A1 | 8/2018 | Peters |
| 2018/0214967 A1 | 8/2018 | Peters |
| 2018/0214972 A1 | 8/2018 | Jansma et al. |
| 2018/0214973 A1 | 8/2018 | Jansma et al. |
| 2018/0281097 A1 | 10/2018 | Jansma |
| 2018/0369947 A1 | 12/2018 | Raudsepp et al. |
| 2019/0047069 A1 | 2/2019 | Weeks et al. |
| 2019/0168334 A1 | 6/2019 | Kooken et al. |
| 2019/0201997 A1 | 7/2019 | Stergios et al. |

FOREIGN PATENT DOCUMENTS

| | | |
|---|---|---|
| CN | 101870032 A | 10/2010 |
| CN | 102448651 A | 5/2012 |
| CN | 102615398 A | 8/2012 |
| CN | 102430846 B | 5/2013 |
| CN | 103071899 A | 5/2013 |
| CN | 103170713 A | 6/2013 |
| CN | 103648702 A | 3/2014 |
| CN | 101712095 B | 9/2014 |
| CN | 104096948 A | 10/2014 |
| CN | 104334305 A | 2/2015 |
| CN | 104439623 A | 3/2015 |
| CN | 204339099 U | 5/2015 |
| CN | 105658368 A | 6/2016 |
| CN | 205464747 U | 8/2016 |
| CN | 105983742 A | 10/2016 |
| CN | 106270978 A | 1/2017 |
| CN | 104972205 B | 4/2017 |
| CN | 106670630 A | 5/2017 |
| CN | 106735769 A | 5/2017 |
| CN | 206241445 U | 6/2017 |
| CN | 206578445 U | 10/2017 |
| CN | 109382566 A | 2/2019 |
| DE | 1115 382 B | 10/1961 |
| DE | 2 108 614 A1 | 10/1971 |
| DE | 129180 A1 | 1/1978 |
| DE | 42 04 661 C1 | 6/1993 |
| DE | 196 11 583 A1 | 9/1997 |
| DE | 196 11 597 A1 | 9/1997 |
| DE | 298 19 828 U1 | 11/1999 |
| DE | 197 38 785 C2 | 12/2001 |
| DE | 10 2008 014915 A1 | 11/2009 |
| DE | 20 2013 102 979 U1 | 7/2013 |
| DE | 10 2016 003468 A1 | 9/2016 |
| DE | 10 2015 122135 A1 | 6/2017 |
| EP | 1707296 A1 | 10/2006 |
| EP | 1 294 522 B1 | 9/2007 |
| EP | 3446821 A1 | 2/2019 |
| EP | 3 656 497 A2 | 5/2020 |
| EP | 3 693 116 A1 | 8/2020 |
| GB | 990208 A | 4/1965 |
| GB | 1 502 288 A | 3/1978 |
| GB | 2 058 637 A | 4/1981 |
| JP | H02-258168 A | 10/1990 |
| JP | 02-280968 A | 11/1990 |
| JP | 04053617 B | 8/1992 |
| JP | H07-1144 A | 1/1995 |
| JP | H0-747474 A | 2/1995 |
| JP | H09-267170 A | 10/1997 |
| JP | H10-113771 A | 5/1998 |
| JP | 2008-055506 A | 3/2008 |
| JP | 2008-087045 A | 4/2008 |
| JP | 2010-069494 A | 4/2010 |
| JP | 2010-082624 A | 4/2010 |
| JP | 5133079 B2 | 1/2013 |
| JP | 2013-039624 A | 2/2013 |
| JP | 5157006 B2 | 3/2013 |
| JP | 5580869 B2 | 8/2014 |
| JP | 6137053 B2 | 5/2017 |
| KR | 2001-0002945 A | 1/2001 |
| KR | 10-2010-0115997 A | 10/2010 |
| KR | 10-1412374 B1 | 6/2014 |
| SU | 1237347 A1 | 6/1986 |
| WO | 1997045227 A1 | 12/1997 |
| WO | 2010/080411 A1 | 7/2010 |
| WO | 2012/153177 A1 | 11/2012 |

OTHER PUBLICATIONS

Extended European Search Report for Corresponding Application No. 21153533.1; dated Jul. 20, 2021; pp. 1-9.

Shi, et al.; "Physical Characteristics of Twin-Wire Indirect Arc Plasma;" Vacuum; vol. 107; Dated Apr. 3, 2014; pp. 41-50.

Extended European Search Report from Corresponding Application No. 19205296.7; dated Aug. 13, 2020; pp. 1-13.

Extended European Search Report from Corresponding Application No. 19205356.9; dated Aug. 13, 2020; pp. 1-9.

Wolf Robotics; "Tandem Wire MIG Welding"; Dated Aug. 29, 2007; pp. 1-8.

Leng, et al.; "The characteristic of twin-electrode TIG coupling arc pressure"; Journal of Physics D: Applied Physics; vol. 39(6):1120; Dated Mar. 3, 2006.

D/F Machine Specialties; "D/F Automatic & Robotic MIG Tandem Torch"; https://www.dfmachinespecialties.com/index.php?option=com_content&view=article&id=35; Accessed on Oct. 15, 2018; pp. 1-4.

Ye, et al.; "Research on arc interference and welding operating point change of twin wire MIG welding"; The International Journal of Advanced Manufacturing Technology; vol. 89, Issue 1-4; Dated Mar. 2017; pp. 493-502.

Ueyama, et al.; "Effects of torch configuration and welding current on weld bead formation in high speed tandem pulsed gas metal arc welding of steel sheets"; Science and Technology of Welding and Joining; vol. 10, No. 6; Dated 2005; Published Online Dec. 4, 2013; pp. 750-759.

Fronius; "CMT Twin"; https://www.fronius.com/en/welding-technology/products/robotic-welding/migmag-high-performance/cmt-twin/cmt-twin; Accessed on Oct. 15, 2018; pp. 1-5.

SKS Welding Systems; "Dual Wire 2.0 for double-speed welding"; https://www.sks-welding.com/en/torch-systems/dual-wire/dual-wire-20/product.html; Accessed on Oct. 15, 2018; pp. 1-2.

Lincoln Electric; "Tandem MIG™ 800 Amp Welding Torch"; https://www.lincolnelectric.com/assets/US/EN/literature/E10601.pdf; Accessed on Oct. 15, 2018; pp. 1-4.

Wire Wizard; "Weld Cell Monitoring and Optimization System"; https://www.wire-wizard.com/ELCoCatalog_web.pdf; Accessed on Oct. 17, 2018; p. 42.

Lincoln Electric; "Wire Level Gauge"; https://www.lincolnelectric.com/assets/us/en/literature/mc0995.pdf; Accessed on Oct. 17, 2018; p. 6.

Miller; Auto-Continuum 350 and 500 w/ Insight Core User Manual; https://www.millerwelds.com/files/owners-manuals/O273473D_MIL.pdf; Dated Nov. 2016; Section 8, pp. 40-43.

Extended European Search Report from Corresponding Application No. 18187717.6; dated Jan. 4, 2019; pp. 1-10.

* cited by examiner

US 11,964,346 B2

DUAL WIRE WELDING OR ADDITIVE MANUFACTURING SYSTEM AND METHOD

CROSS-REFERENCE TO RELATED APPLICATIONS

This application is a continuation of U.S. patent application Ser. No. 15/671,295 filed on Aug. 8, 2017, which is incorporated herein by reference.

BACKGROUND OF THE INVENTION

Field of the Invention

Devices, systems, and methods consistent with the invention relate to material deposition with a dual wire configuration using a single contact tip assembly.

Description of the Related Art

When welding, it is often desirable to increase the width of the weld bead or increase the length of the weld puddle during welding. There can be many different reasons for this desire, which are well known in the welding industry. For example, it may be desirable to elongate the weld puddle to keep the weld and filler metals molten for a longer period of time so as to reduce porosity. That is, if the weld puddle is molten for a longer period of time there is more time for harmful gases to escape the weld bead before the bead solidifies. Further, it may be desirable to increase the width of a weld bead so as to cover wider weld gap or to increase a wire deposition rate. In both cases, it is common to use an increased electrode diameter. The increased diameter will result in both an elongated and widen weld puddle, even though it may be only desired to increase the width or the length of the weld puddle, but not both. However, this is not without its disadvantages. Specifically, because a larger electrode is employed more energy is needed in the welding arc to facilitate proper welding. This increase in energy causes an increase in heat input into the weld and will result in the use of more energy in the welding operation, because of the larger diameter of the electrode used. Further, it may create a weld bead profile or cross-section that is not ideal for certain mechanical applications.

BRIEF SUMMARY OF THE INVENTION

An exemplary embodiment of the present invention is a welding system and method for welding where a welding power supply provides a welding waveform to a contact tip assembly having two exit orifices. A wire feeding mechanism provides at least two welding electrodes to two different channels in the contact tip assembly, where each of the electrodes passes through their respective the channels and exit the contact tip assembly through their respective orifices. The welding waveform is provided to each of the electrodes by the contact tip assembly for a welding operation.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
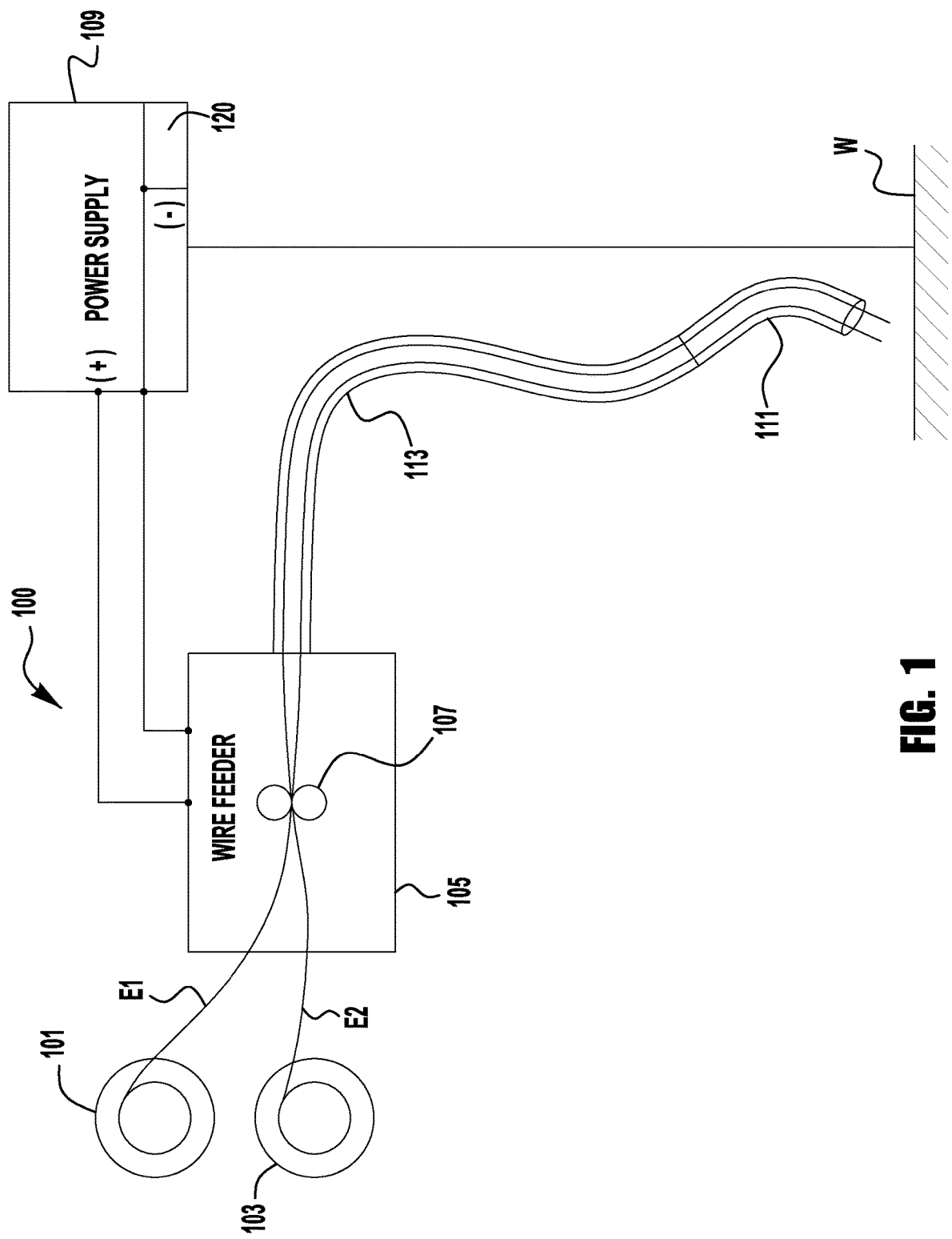
FIG. 1 illustrates a diagrammatical representation of an exemplary embodiment of a welding system of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

While embodiments of the present invention discussed herein are discussed in the context of GMAW type welding, other embodiments or the invention are not limited thereto. For example, embodiments can be utilized in SAW and FCAW type welding operations, as well as other similar types of welding operations. Further, while the electrodes described herein are solid electrodes, again, embodiments of the present invention are not limited to the use of solid electrodes as cored electrodes (either flux or metal cored) can also be used without departing from the spirit or scope of the present invention. Further, embodiments of the present invention can also be used in manual, semi-automatic and robotic welding operations. Because such systems are well known, they will not be described in detail herein.

Turning now to the Figures, FIG. 1 depicts an exemplary embodiment of a welding system 100 in accordance with an exemplary embodiment of the present invention. The welding system 100 contains a welding power source 109 which is coupled to both a welding torch 111 (having a contact tip assembly—not shown) and a wire feeder 105. The power source 109 can be any known type of welding power source capable of delivery the current and welding waveforms described herein, for example, pulse spray, STT and/or short arc type welding waveforms. Because the construction, design and operation of such power supplies are well known, they need not be described in detail herein. It is also noted that welding power can be supplied by more than one power supply at the same time—again the operation of such systems are known. The power source 109 can also include a controller 120 which is coupled to a user interface to allow a user to input control or welding parameters for the welding operation. The controller 120 can have a processor, CPU, memory etc. to be used to control the operation of the welding process as described herein. The torch 111, which can be constructed similar to known manual, semi-automatic or robotic welding torches can be coupled to any known or used welding gun and can be of a straight or gooseneck type as described above. The wire feeder 105 draws the electrodes E1 and E2 from electrode sources 101 and 103, respectively, which can be of any known type, such as reels, spools, containers or the like. The wire feeder 105 is of a known construction and employs feed rolls 107 to draw the electrodes E1 and E2 and push the electrodes to the torch 111. In an exemplary embodiment of the present invention, the feed rolls 107 and wire feeder 105 are configured for a single electrode operation. Embodiments of the present invention, using a dual wire configuration, can be utilized with a wire feeder 105 and rollers 107 only designed for a single wire feeding operation. For example, rollers 107 can be configured for a single 0.045 inch diameter electrode, but will suitable drive two electrodes of a 0.030 inch diameter without modification to the wire feeder 105 or the rollers 107. Alternatively, the wire feeder 105 can be designed to provide separate sets of rollers for feeding the electrodes E1/E2 respectively. In other embodiments, two separate wire feeders can also be used. As shown, the wire feeder(s) 105 is in communication with the power source 109 consistent with known configurations of welding operations.

Once driven by the rollers 107, the electrodes E1 and E2 are passed through a liner 113 to deliver the electrodes E1 and E2 to the torch 111. The liner 113 is appropriately sized to allow for the passage of the electrodes E1 and E2 to the torch 111. For example, for two 0.030 inch diameter electrodes, a standard 0.0625 inch diameter liner 113 (which is typically used for a single 0.0625 inch diameter electrode) can be used with no modification.

Although the examples referenced above discuss the use of two electrodes having a same diameter, the present invention is not limited in this regard as embodiments can use electrodes of a different diameter. That is, embodiments of the present invention can use an electrode of a first, larger, diameter and an electrode of a second, smaller, diameter. In such an embodiment, it is possible to more conveniently weld two work pieces of different thicknesses. For example, the larger electrode can be oriented to the larger work piece while the smaller electrode can be oriented to the smaller work piece. Further, embodiments of the present invention can be used for many different types of welding operations including, but not limited to, metal inert gas, submerged arc, and flux-cored welding. Further, embodiments of the present invention can be used for automatic, robotic and semi-automatic welding operations. Additionally, embodiments of the present invention can be utilized with different electrode types. For example, it is contemplated that a cored electrode can be coupled with a non-cored electrode. Further, electrodes of differing compositions can be used to achieve the desired weld properties and composition of the final weld bead. Thus, embodiments of the present invention can be utilized a broad spectrum of welding operations.

Figure 2:
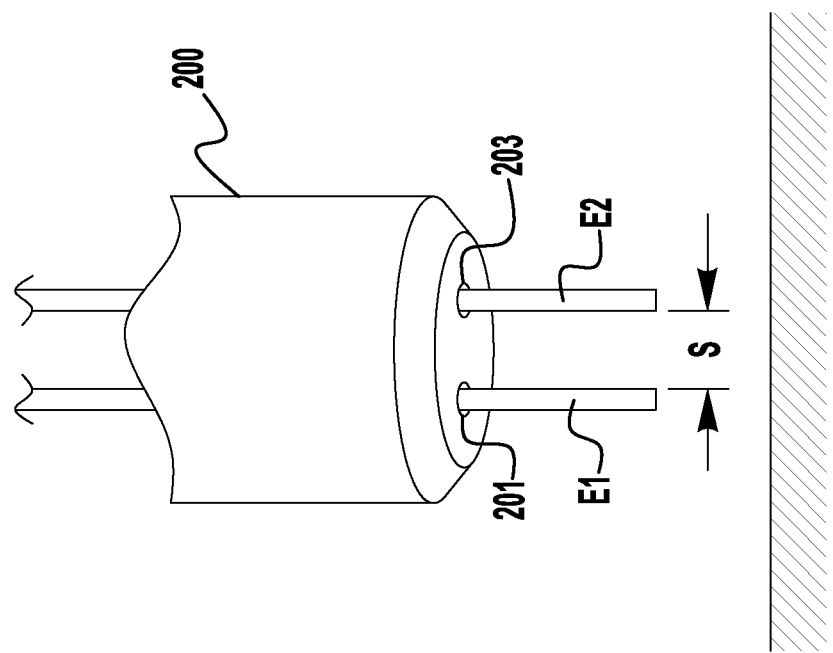
FIG. 2 illustrates a diagrammatical representation of an exemplary contact tip assembly in an embodiment of the present invention.

FIG. 2 depicts an exemplary contact tip assembly 200 of the present invention. The contact tip assembly 200 can be made from known contact tip materials and can be used in any known type of welding gun. As shown in this exemplary embodiment, the contact tip assembly has two separate channels 201 and 230 which run the length of the contact tip assembly 200. During welding a first electrode E1 is passed through the first channel 201 and the second electrode E2 is passed through the second channel 203. The channels 201/203 are typically sized appropriately for the diameter of wire that is to be passed there through. For example, if the electrodes are to have the same diameter the channels will have the same diameters. However, if different diameters are to be used then the channels should be sixed appropriately so as to properly transfer current to the electrodes. Additionally, in the embodiment shown, the channels 201/203 are configured such that the electrodes E1/E2 exit the distal end face of the contact tip 200 in a parallel relationship. However, in other exemplary embodiments the channels can be configured such that the electrodes E1/E2 exit the distal end face of the contact tip such that an angle in the range of +/−15° exists between the centerlines of the respective electrodes. The angling can be determined based on the desired performance characteristics of the welding operation. It is further noted that in some exemplary embodiments the contact tip assembly can be a single integrated with a channels as shown, while in other embodiments the contact tip assembly can be comprised of two contact tip subassemblies located close to each other, where the current is directed to each of the contact tip subassemblies.

As shown in FIG. 2, the respective electrodes E1/E2 are spaced by a distance S which is the distance between the closest edges of the electrodes. In exemplary embodiments of the present invention, this distance is in the range of 1 to 4 times the diameter of the larger of the two electrodes E1/E2, while in other exemplary embodiments the distance S is in the range of 2 to 3 times the largest diameter. For example, if each of the electrodes has a diameter of 1 mm, the distance S can be in the range of 2 to 3 mm. Further, in manual or semi-automatic welding operations the distance S can be in the range of 1.75 to 2.25 times the largest electrode diameter, whereas in robotic welding operations the distance S can be in the range of 2.5 to 3.5 times the largest electrode diameter. In exemplary embodiments, the distance S is in the range of 1.5 to 3.5 mm.

As explained further below, the distance S should be selected to ensure that a single bridge droplet is formed between the electrodes, before the droplet is transfer, while preventing the electrodes from contacting each other, other than through the bridge droplet.

Figure 3A:
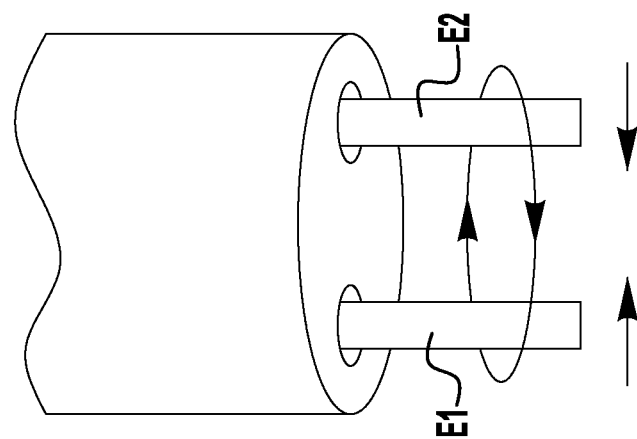
FIGS. 3A to 3C illustrate diagrammatical representations of a welding operation in an exemplary embodiment of the present invention.

FIG. 3A depicts an exemplary embodiment of the present invention, while showing in the interactions of the magnetic forces from the respective electrodes E1 and E2. As shown, due to the flow of current, a magnetic field is generated around the electrodes which tends to create a pinch force that draws the wires towards each other. This magnetic force tends to create a droplet bridge between the two electrodes, which will be discussed in more detail below.

Figure 3C:
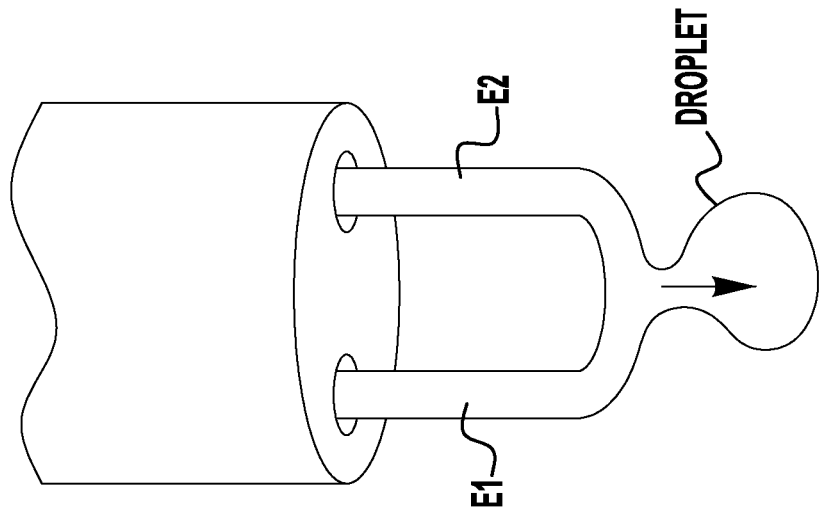
Figure 3B:
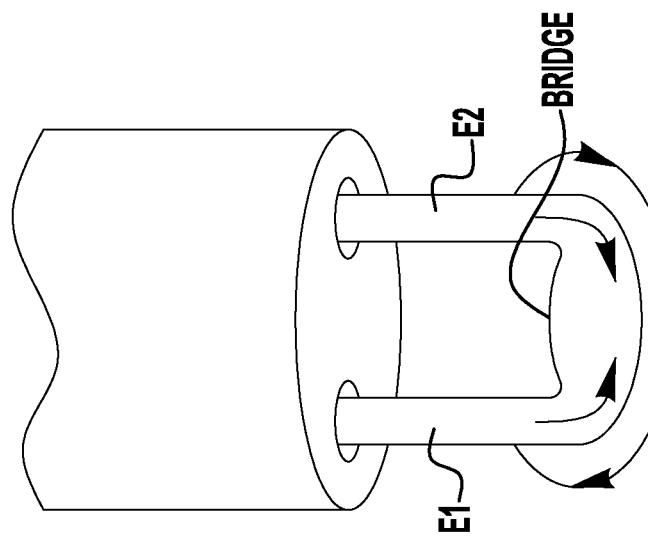

FIG. 3B shows the droplet bridge that is created between the two electrodes. That is, as the current passing through each of the electrodes melts the ends of the electrodes the magnetic forces tend to draw the molten droplets towards each other until they connect with each other. The distance S is far enough such that the solid portions of the electrodes are not drawn to contact each other, but close enough that a droplet bridge is created before the molten droplet is transferred to the weld puddle created by the welding arc. The droplet is depicted in FIG. 3C where the droplet bridge creates a single large droplet that is transferred to the puddle during welding. As show, the magnetic pinch force acting on the droplet bridge acts to pinch off the droplet similar to the use of pinch force in a single electrode welding operation.

Figure 4A:
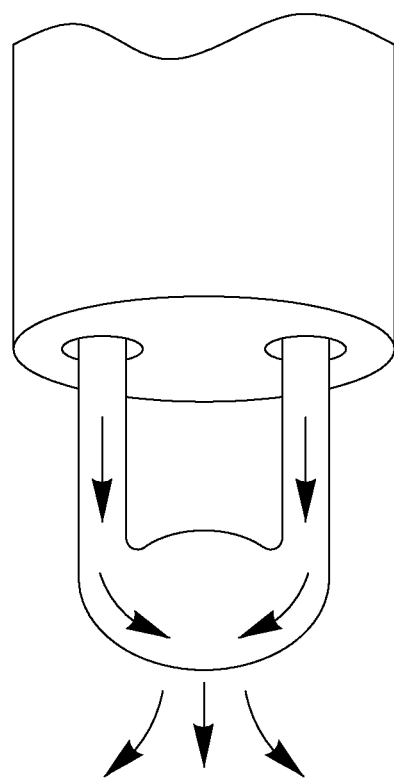
FIGS. 4A to 4B illustrate diagrammatical representations current and magnetic field interactions in exemplary embodiments of the present invention.
Figure 4B:
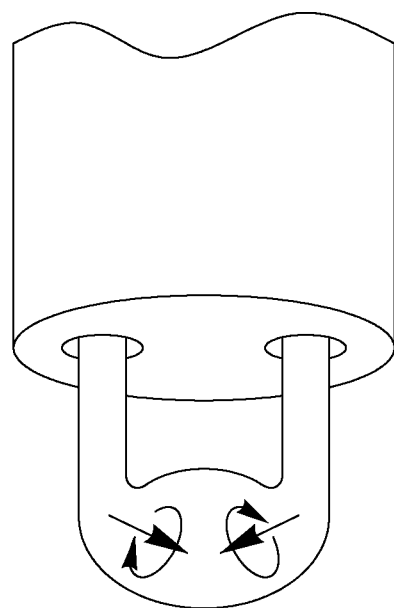

Further, FIG. 4A depicts an exemplary representation of current flow in an embodiment of the present invention. As shown the welding current is divided so as to flow through each of the respective electrodes and passes to and through the bridge droplet as it is formed. The current then passes from the bridge droplet to the puddle and work piece. In exemplary embodiments where the electrodes are of the same diameter and type the current will be essentially divided evenly through the electrodes. In embodiments where the electrodes have different resistance values, for example due to different diameters and/or compositions/construction, the respective currents will be apportioned due to the relationship of V=I*R, as the welding current is applied to the contact tip similar to known methodologies and the contact tip provides the welding current to the respective electrodes via the contact between the electrodes and the channels of the contact tip. FIG. 4B depicts the magnetic forces within the bridge puddle that aid in creating the bridge droplet. As shown, the magnetic forces tend to pull the respective molten portions of the electrodes towards each other until they contact with each other.

Figure 5A:
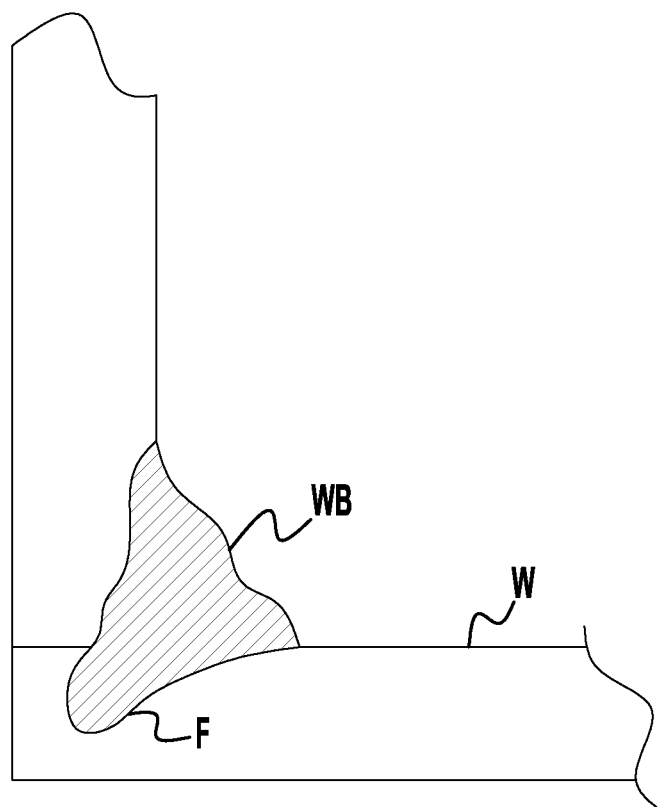
FIG. 5A illustrates a diagrammatical representation of an exemplary weld bead with a single wire and FIG. 5B illustrates a diagrammatical representation of an exemplary weld bead with an embodiment of the invention.
Figure 5B:
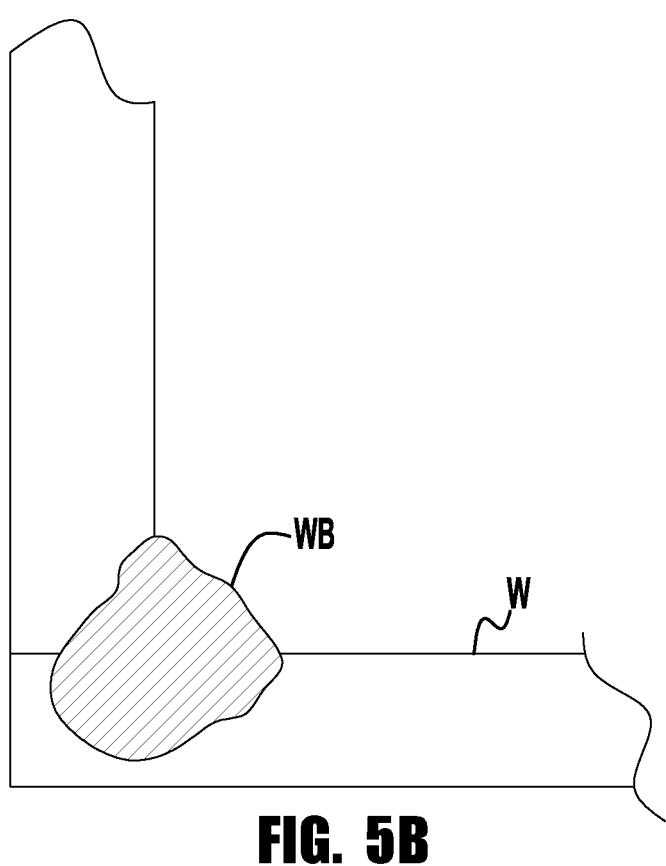

FIG. 5A depicts an exemplary cross-section of a weld made with a single electrode welding operation. As shown, while the weld bead WB is of an appropriate width, the finger F of the weld bead WB, which penetrates into the workpieces W as shown, has a relatively narrow width. This can occur in single wire welding operations when higher deposit rates are used. That is, in such welding operations the finger F can become so narrow that it is not reliable to assume that the finger penetrated in the desired direction, and thus cannot be a reliable indicator of proper weld penetration. Further, as this narrow finger dives deeper this can lead to defects such as porosity trapped near the finger. Additionally, in such welding operations the useful sides of the weld bead are not as deeply penetrated as desired. Thus, in certain applications this mechanical bond is not as strong as desired. Additionally, in some welding applications, such as when welding horizontal fillet welds, the use of a single electrode made it difficult to achieve equal sized weld legs, at high deposition speeds, without the addition of too much heat to the welding operation. These issues are alleviated with embodiments of the present invention which can reduce the penetration of the finger and spread the finger making the side penetration of the weld wider. An example of this is shown in FIG. 5B, which shows a weld bead of an embodiment of the present invention. As shown in this embodiment, a similar, or improved weld bead leg symmetry and/or length can be achieved, as well as a wider weld bead at the weld depth within the weld joint. This improved weld bead geometry is achieved while using less overall heat input into the weld. Therefore, embodiments of the present invention can provide improved mechanical weld performance with lower amounts of heat input, and at improved deposition rates.

Figure 6:
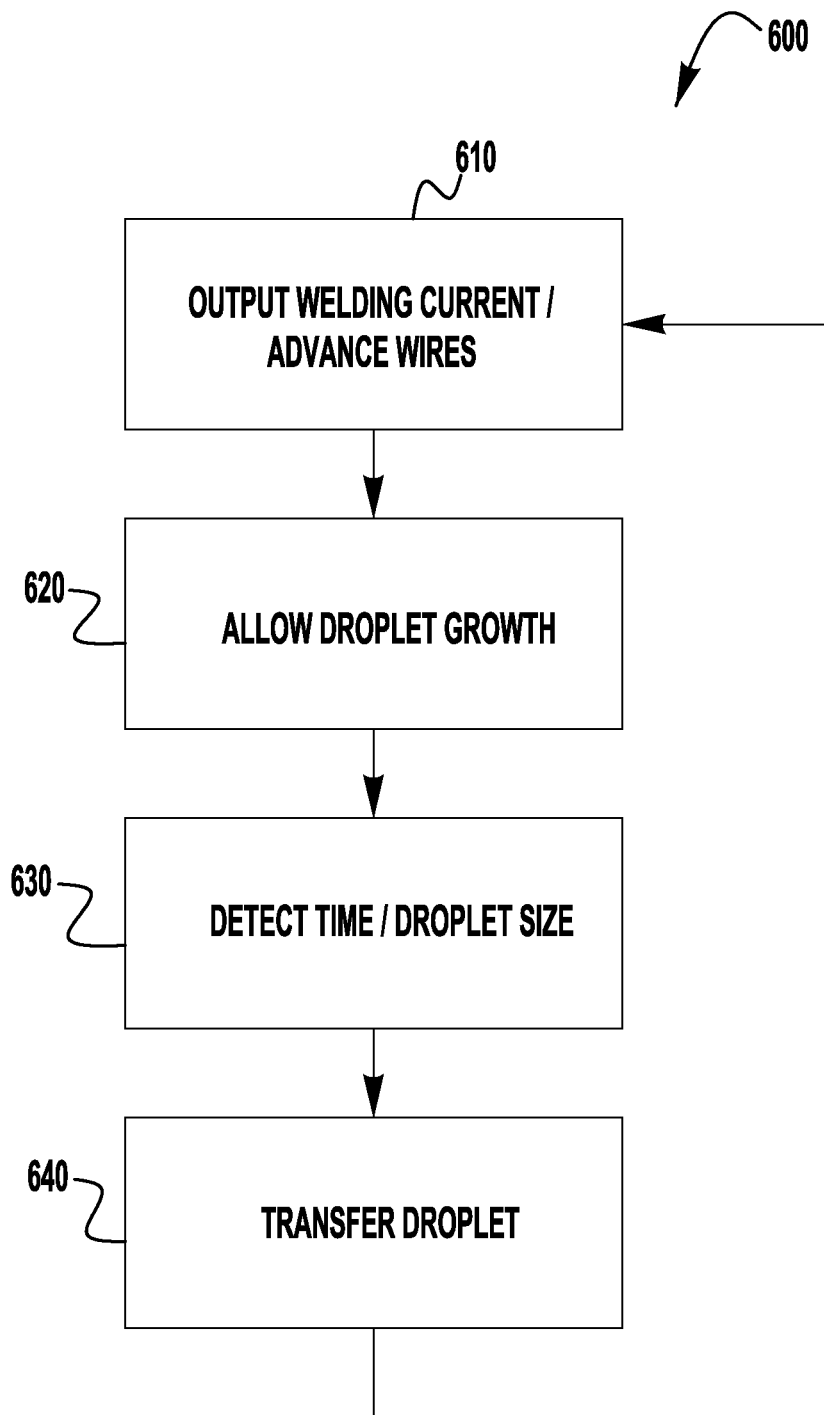
FIG. 6 illustrates a diagrammatical representation of an exemplary weld process flow chart for an embodiment of the present invention.

FIG. 6 depicts a flow chart 600 of an exemplary welding operation of the present invention. This flow chart is intended to be exemplary and is not intended to be limiting. As shown, a welding current/output is provided by the welding power source 610 such that current is directed to the contact tip and electrodes consistent with known system constructions. Exemplary waveforms are discussed further below. During welding a bridge droplet is allowed to form 620 between the electrodes where the respective droplets from each electrode contact each other to create a bridge droplet. The bridge droplet is formed prior to contacting the weld puddle. During formation of the bridge droplet at least one of a duration or a droplet size is detected until such time as the droplet reaches a size to be transferred, and then the droplet is transferred to the puddle 640. The process is repeated during the welding operation. To control the welding process the power source controller/control system can use either one of a bridge droplet current duration and/or a bridge droplet size detection to determine if the bridge droplet is of a size to be transferred. For example, in one embodiment a predetermined bridge current duration is used for a given welding operation such that a bridge current is maintained for that duration, after which droplet transfer is then initiated. In a further exemplary embodiment, the controller of the power source/supply can monitor the welding current and/or voltage and utilize a predetermined threshold (for example a voltage threshold) for a given welding operation. For example, in such embodiments, as the detected arc voltage (detected via a known type of arc voltage detection circuit) detects that the arc voltage has reached a bridge droplet threshold level the power supply initiates a droplet separation portion of the welding waveform. This will be discussed further below in some exemplary embodiments of welding waveforms that can be used with embodiments of the present invention.

Figure 7:
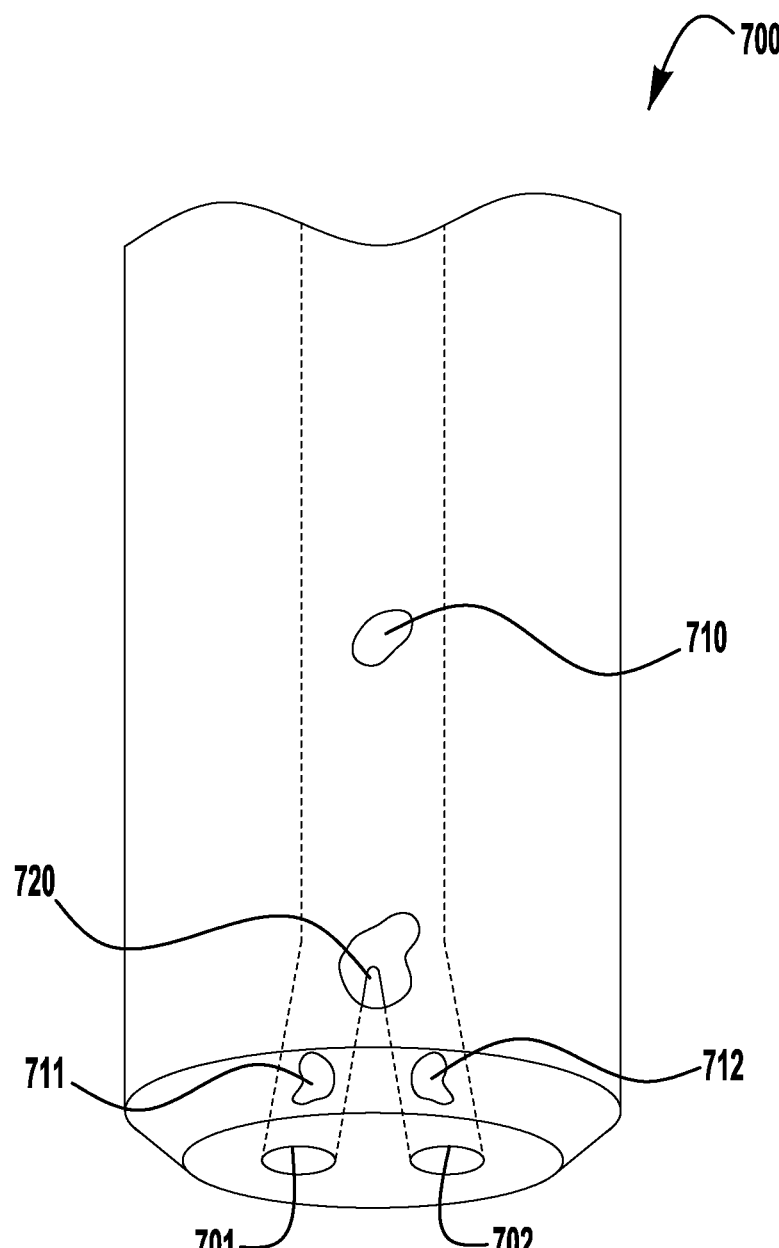
FIG. 7 illustrates a diagrammatical representation of an alternative embodiment of a contact tip assembly for use with embodiments of the present invention.

FIG. 7 depicts an alternative exemplary embodiment of a contact tip 700 that can be used with embodiments of the present invention. As described previously, in some embodiments the electrodes can be directed to the torch via a single wire guide/liner. Of course, in other embodiments, separate wire guide/liners can be used. However, in those embodiments, where a single wire guide/liner is used the contact tip can be designed such that the electrodes are separated from each other within the contact tip. As shown in FIG. 7, this exemplary contact tip 700 has a single entrance channel 710 with a single orifice at the upstream end of the contact tip 700. Each of the electrodes enter the contact tip via this orifice and pass along the channel 710 until they reach a separation portion 720 of the contact tip, where the separation portion directs one electrode into a first exit channel 711 and a second electrode into the second exit channel 712, so that the electrodes are directed to their discrete exit orifices 701 and 702, respectively. Of course, the channels 710, 711 and 712 should be sized appropriately for the size of electrodes to be used, and the separation portion 720 should be shaped so as to not scar or scratch the electrodes. As shown in FIG. 7, the exit channels 711 and 712 are angled relative to each other, however, as shown in FIG. 2, these channels can also be oriented parallel to each other.

Figure 8:
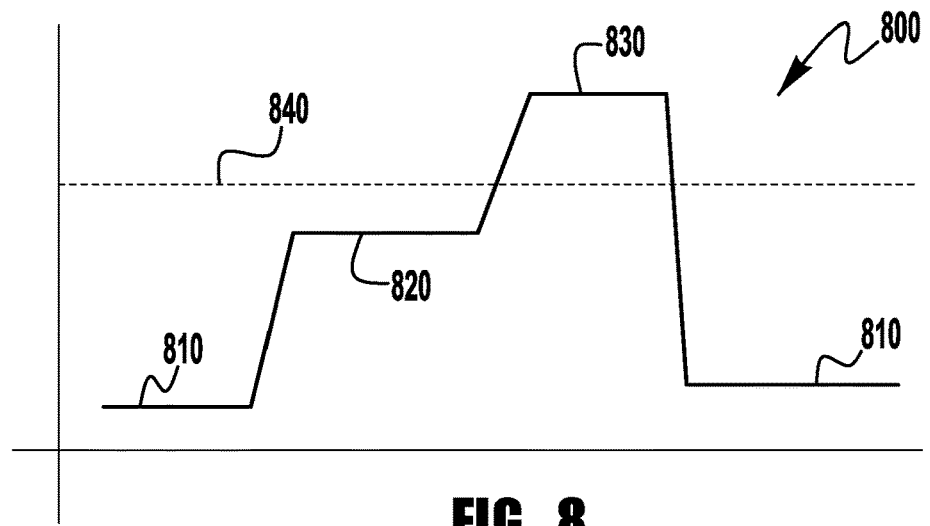
FIG. 8 illustrates a diagrammatical representation of an exemplary weld current waveform for embodiments of the present invention.
Figure 9:
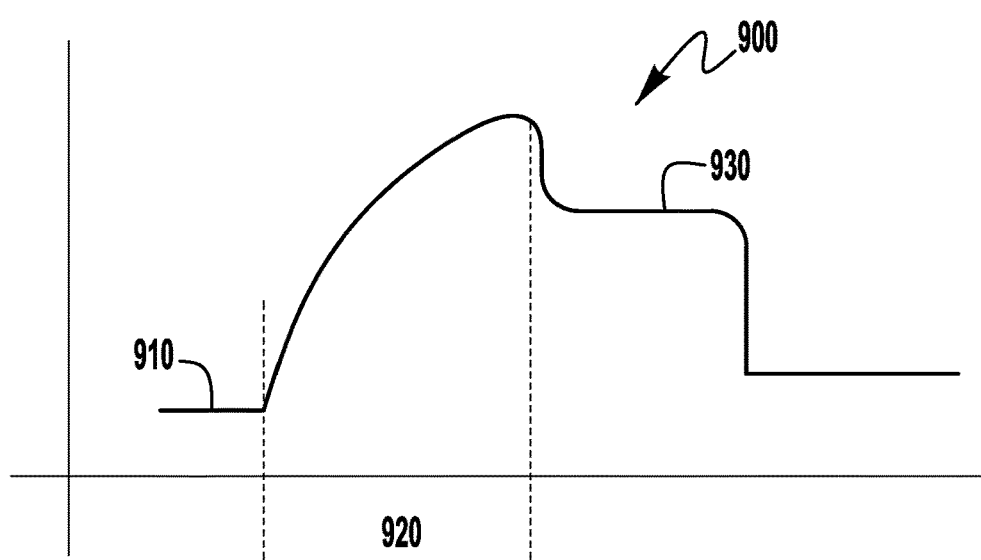
FIG. 9 illustrates a diagrammatical representation of a further exemplary weld current waveform for embodiments of the present invention.
Figure 10:
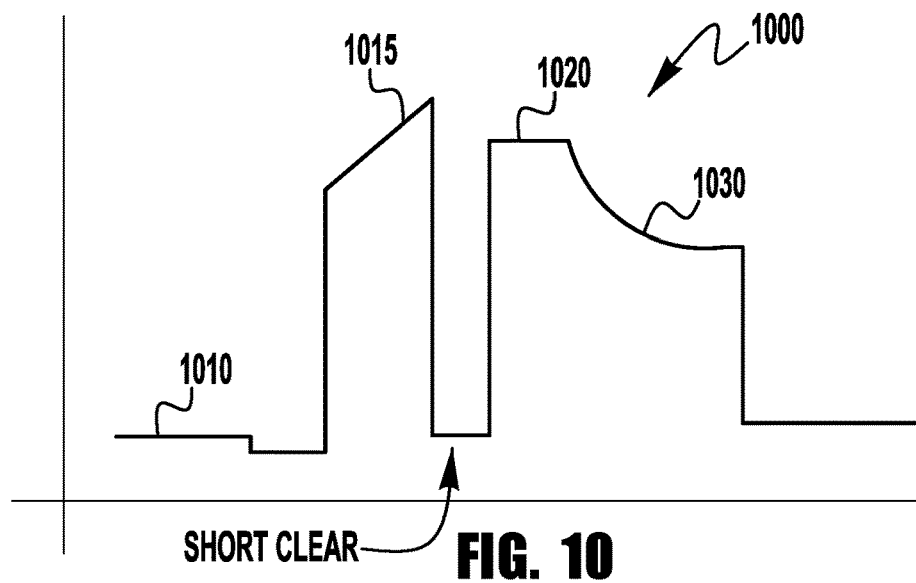
FIG. 10 illustrates a diagrammatical representation of an additional exemplary weld current waveform for embodiments of the present invention.

Turning now to FIGS. 8 through 10, various exemplary waveforms that can be used with exemplary embodiments of the present invention are depicted. In general, in exemplary embodiments of the present invention, the current is increased to create the bridge droplet and build it for transfer. In exemplary embodiments, at transfer the bridge droplet has an average diameter which is similar to the distance S between the electrodes, which can be larger than the diameter of either of the electrodes. When the droplet is formed it is transferred via a high peak current, after which the current drops to a lower (e.g. background) level to remove the arc pressure acting on the wires. The bridging current then builds the bridge droplet without exerting too much pinch force to pinch off the developing droplet. In exemplary embodiments, this bridging current is at a level in the range of 30 to 70% between the background current and the peak current. In other exemplary embodiments, the bridging current is in the range of 40 to 60% between the background current and the peak current. For example, if the background current is 100 amps and the peak current is 400 amps, the bridging current is in the range of 220 to 280 amps (i.e., 40 to 60% of the 300 amp difference). In some embodiments the bridging current can be maintained for a duration in the range of 1.5 to 8 ms, while in other exemplary embodiments the bridging current is maintained for a duration in the range of 2 to 6 ms. In exemplary embodiments the bridging current duration begins at the end of the background current state and includes the bridging current ramp up, where the ramp up can be in the range of 0.33 to 0.67 ms depending on the bridging current level and the ramp rate. With exemplary embodiments of the present invention, the pulse frequency of waveforms can be slowed down as compared to single wire processes to allow for droplet growth which can improve control and allow for higher deposition rates as compared to single wire operations.

FIG. 8 depicts an exemplary current waveform 800 for a pulsed spray welding type operation. As shown, the waveform 800 has a background current level 810, which then transitions to a bridge current level 820, during which the bridge droplet is grown to a size to be transferred. The bridge current level is less than a spray transition current level 840 at which the droplet starts its transfer to the puddle. At the conclusion of the bridge current 820 the current is raised to beyond the spray transition current level 840 to a peak current level 830. The peak current level is then maintained for a peak duration to allow for the transfer of the droplet to be completed. After transfer the current is then lowered to the background level again, as the process is repeated. Thus, in these embodiments the transfer of the single droplet does not occur during the bridge current portion of the waveform. In such exemplary embodiments, the lower current level for the bridge current 820 allows a droplet to form without excessive pinching force to direct the droplet to the puddle. Because of the use of the bridge droplet, welding operations can be attained where the peak current 830 can be maintained for a longer duration at a higher level than using a single wire. For example, some embodiments can maintain the peak duration for at least 4 ms, and in the range of 4 to 7 ms, at a peak current level in the range of 550 to 700 amps, and a background current in the range of 150 to 400 amps. In such embodiments, a significantly improved deposition rate can be achieved. For example, some embodiments have achieved deposition rates in the range of 19 to 26 lbs/hr, whereas similar single wire processes can only achieve a deposition rate in the range of 10 to 16 lbs/hr. For example, in one non-limiting embodiment a pair of twin wires having a diameter of 0.040", using a peak current of 700 amps, a background current of 180 amps and a droplet bridge current of 340 amps can be deposited at a rate of 19 lb/hr at a frequency of 120 Hz. Such a deposition is at a frequency much less than conventional welding processes, and thus more stable.

FIG. 9 depicts another exemplary waveform 900 that can be used in a short arc type welding operation. Again, the waveform 900 has a background portion 910 prior to a short response portion 920 which is structured to clear a short between the droplet and the puddle. During the shorting response 920 the current is raised to clear the short and as the short is cleared the current is dropped to a bridge current level 930 during which the bridge droplet is formed. Again, the bridge current level 930 is less than the peak current level of the shorting response 920. The bridge current level 930 is maintained for a bridge current duration that allows a bridge droplet to be formed and directed to the puddle. During transfer of the droplet current is then dropped to the background level, which allows the droplet to advance until a short occurs. When a short occurs the shorting response/bridge current waveform is repeated. It should be noted that in embodiments of the present invention it is the presence of the bridge droplet that makes the welding process more stable. That is, in traditional welding processes that use multiple wires there is no bridge droplet. In those processes when one wire shorts or makes contact with the puddle the arc voltage drops and the arc for the other electrode will go out. This does not occur with embodiments of the present invention, where the bridge droplet is common to each of the wires.

FIG. 10 depicts a further exemplary waveform 1000, which is a STT (surface tension transfer) type waveform. Because such waveforms are known, they will not be described in detail herein. To further explain an STT type waveform, its structure, use and implementation, US. Publication No. 2013/0264323, filed on Apr. 5, 2012, is incorporated herein in its entirety. Again, this waveform has a background level 1010, and a first peak level 1015 and a second peak level 1020, where the second peak level is reached after a short between the droplet and puddle is cleared. After the second peak current level 1020, the current is dropped to a bridge current level 1030 where the bridge droplet is formed, after which the current is dropped to the background level 1010 to allow the droplet to be advanced to the puddle, until it makes contact with the puddle. In other embodiments, an AC waveform can be used, for example an AC STT waveform, pulse waveform, etc. can be used.

The use of embodiments described herein can provide significant improvements in stability, weld structure and performance over known welding operations. However, in addition to welding operations, embodiments can be used in additive manufacturing operations. In fact the system 100 described above can be used in additive manufacturing operations as in welding operations. In exemplary embodiments, improved deposition rates can be achieved in additive manufacturing operations. For example, when using an STT type waveform a single wire additive process, using an 0.045" wire can provide a deposition rate of about 5 lb/hr before becoming unstable. However, when using embodiments of the present invention and two 0.040" wires a deposition rate of 7 lbs/hr can be achieved in a stable transfer. Because additive manufacturing processes and systems are known, the details of which need not be described herein. In such processes a bridging current, such as that descried above, can be used in the additive manufacturing current waveform.

It is noted that exemplary embodiments are not limited to the usage of the waveforms discussed above and described herein, as other welding type waveforms can be used with embodiments of the present invention. For example, other embodiments can use variable polarity pulsed spray welding waveforms, AC waveforms, etc. without departing from the spirit and scope of the present invention. For example, in variable polarity embodiments the bridge portion of the welding waveform can be done in a negative polarity such that the bridge droplet is created while reducing the overall heat input into the weld puddle. For example, when using AC type waveforms, the waveforms can have a frequency of 60 to 200 Hz of alternating negative and positive pulses to melt the two wires and form the bridge droplet between them. In further embodiments the frequency can be in the range of 80 to 120 Hz.

As explained previously, embodiments of the present invention can be used with different types and combinations of consumables including flux cored consumables. In fact, embodiments of the present invention can provide a more stable welding operation when using flux cored electrodes. Specifically, the use of a bridging droplet can aid in stabilizing flux core droplets that can tend to be unstable in a single wire welding operation. Further, embodiments of the present invention allow for increased weld and arc stability at higher deposition rates. For example, in single wire welding operations, at high current and high deposition rates the transfer type for the droplets can change from streaming spray to a rotational spray, which appreciably reduces the stability of the welding operation. However, with exemplary embodiments of the present invention the bridge droplet stabilizes the droplets which significantly improves arc and weld stability at high deposition rates, such as those above 20 lb/hr.

Additionally, as indicated above the consumables can be of different types and/or compositions, which can optimize a given welding operation. That is, the use of two different, but compatible, consumables can be combined to create a desired weld joint. For example, compatible consumables include hardfacing wires, stainless wires, nickel alloys and steel wires of different composition can be combined. As one specific example a mild steel wire can be combined with an overalloyed wire to make a 309 stainless steel composition. This can be advantageous when a single consumable of the type desired does not have desirable weld properties. For example, some consumables for specialized welding provide the desired weld chemistry but are extremely difficult to use and have difficulty providing a satisfactory weld. However, embodiments of the present invention allow for the use of two consumables that are easier to weld with to be combined to create the desired weld chemistry. Embodiments of the present invention can be used to create an alloy/deposit chemistry that is not otherwise commercially available, or otherwise very expensive to manufacture. Thus, two different consumables can be used to obviate the need for an expensive or unavailable consumable. Further, embodiments can be used to create a diluted alloy, for example, the first wire is a common inexpensive alloy and the second is wire is a specialty wire. The desired deposit would be the average of the two wires, mixed well in the formation of the bridged droplet, at the lower average cost of the two wires, over an expensive specialty wire. Further, in some applications, the desired deposit could be unavailable due to the lack of appropriate consumable chemistry, but could be reached by mixing two standard alloy wires, mixed within the bridged droplet and deposited as a single droplet. Further, in some applications, such as the application of wear resistance metals, the desired deposit may be combination of tungsten carbide particles from one wire and chrome carbide particles from another. Still in another application, a larger wire housing larger particles within is mixed with a smaller wire containing less particles or smaller particles is used to deposit a mixture of the two wires. Here the expected contribution from each of the wires is proportional to the size of wire given the wire feed speeds are same. In yet another example, the wire feed speeds of the wires is different to allow the alloy produced to change based on the desired deposit but the mixing of the wires is still produced by the bridged droplet created between the wires.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding or additive manufacturing system, comprising:
a power supply comprising a controller which controls operations of the power supply during gas metal arc welding, wherein the power supply provides a current waveform to a contact tip having a first channel terminating in a first exit orifice and second channel terminating in a second exit orifice, wherein the first channel is parallel with the second channel, and the first channel is configured to pass through a first wire electrode and the second channel is configured to pass through a second wire electrode, wherein the current waveform includes a bridge current portion and another current portion having a current level greater than the bridge current portion;
wherein the first exit orifice is separated from the second exit orifice such that a distance provided between the first wire electrode and the second wire electrode facilitates a formation of a bridge droplet between the first wire electrode and the second wire electrode while preventing solid portions of the first wire electrode delivered through the first exit orifice from contacting solid portions of the second wire electrode delivered through the second exit orifice during the gas metal arc welding, wherein the bridge droplet forms during the bridge current portion of the current waveform and couples the first wire electrode and second wire electrode prior to contacting a puddle during the gas metal arc welding, and
wherein a current due to the current waveform flows from the contact tip to the bridge droplet through both of the first wire electrode and the second wire electrode and the current is divided between the first wire electrode and the second wire electrode, and wherein the current flows from the bridge droplet to the puddle.

2. The system of claim 1, wherein the distance is in the range of 1.5 to 3.5 mm.

3. The system of claim 1, further comprising a wire feeder configured to drive one or both of the first wire electrode and the second wire electrode through the contact tip.

4. The system of claim 1, wherein the first wire electrode has a first composition and the second wire electrode has a second composition different from the first composition.

5. The system of claim 1, wherein the first wire electrode has a first diameter and the second wire electrode has a second diameter which is different than the first diameter.

6. The system of claim 1, wherein a deposition rate during the gas metal arc welding is in a range of 19 to 26 lbs/hr.

7. A welding or additive manufacturing system, comprising:
a power supply comprising a controller which controls operations of the power supply, wherein the power supply provides a current waveform to a contact tip having a first channel terminating in a first exit orifice and second channel terminating in a second exit orifice, wherein the first channel is parallel with the second channel, and the first channel is configured to pass through a first wire electrode and the second channel is configured to pass through a second wire electrode, wherein the current waveform includes a bridge current portion and another current portion having a current level different from the bridge current portion;
wherein the first exit orifice is separated from the second exit orifice such that a distance provided between the first wire electrode and the second wire electrode facilitates a formation of a bridge droplet between the first wire electrode and the second wire electrode while preventing solid portions of the first wire electrode delivered through the first exit orifice from contacting solid portions of the second wire electrode delivered through the second exit orifice during a deposition operation, wherein the bridge droplet forms during the bridge current portion of the current waveform and couples the first wire electrode and second wire electrode prior to contacting a puddle during the deposition operation, wherein a current due to the current waveform flows from the contact tip to the bridge droplet through both of the first wire electrode and the second wire electrode and the current is divided between the first wire electrode and the second wire electrode, and wherein the current flows from the bridge droplet to the puddle, and wherein the first wire electrode and the second wire electrode are cored electrodes.

8. The system of claim 7, wherein the distance is in the range of 1.5 to 3.5 mm.

9. The system of claim 7, further comprising a wire feeder configured to drive one or both of the first wire electrode and the second wire electrode through the contact tip.

10. The system of claim 7, wherein the first wire electrode has a first composition and the second wire electrode has a second composition different from the first composition.

11. The system of claim 7, wherein the first wire electrode has a first diameter and the second wire electrode has a second diameter which is different than the first diameter.

12. The system of claim 7, wherein a deposition rate of the deposition operation is in a range of 19 to 26 lbs/hr.

13. A welding or additive manufacturing system, comprising:
  a power supply comprising a controller which controls operations of the power supply, wherein the power supply provides a current waveform to a contact tip having a first channel terminating in a first exit orifice and second channel terminating in a second exit orifice, wherein the first channel is configured to pass through a first wire electrode and the second channel is configured to pass through a second wire electrode, wherein the current waveform includes a bridge current portion and another current portion having a current level less than than the bridge current portion;
  wherein the first exit orifice is separated from the second exit orifice such that a distance provided between the first wire electrode and the second wire electrode facilitates a formation of a bridge droplet between the first wire electrode and the second wire electrode while preventing solid portions of the first wire electrode delivered through the first exit orifice from contacting solid portions of the second wire electrode delivered through the second exit orifice during a deposition operation, wherein the bridge droplet forms during the bridge current portion of the current waveform and couples the first wire electrode and second wire electrode prior to contacting a puddle during the deposition operation, and wherein a current due to the current waveform flows from the contact tip to the bridge droplet through both of the first wire electrode and the second wire electrode and the current is divided between the first wire electrode and the second wire electrode, and wherein the current flows from the bridge droplet to the puddle.

14. The system of claim 13, wherein the distance is in the range of 1.5 to 3.5 mm.

15. The system of claim 13, further comprising a wire feeder configured to drive one or both of the first wire electrode and the second wire electrode through the contact tip.

16. The system of claim 13, wherein the first wire electrode has a first composition and the second wire electrode has a second composition different from the first composition.

17. The system of claim 13, wherein the first wire electrode has a first diameter and the second wire electrode has a second diameter which is different than the first diameter.

18. The system of claim 13, wherein the first channel is parallel with the second channel.

19. The system of claim 13, wherein an angle between a centerline of the first wire electrode when exiting the first channel and a centerline of the second wire electrode when exiting the second channel is in the range of +15 degrees to −15 degrees.

20. The system of claim 13, wherein at least one of the first wire electrode and the second wire electrode is a flux cored electrode.

21. The system of claim 13, wherein at least one of the first wire electrode and the second wire electrode is a metal cored electrode.

22. The system of claim 13, wherein a deposition rate of the deposition operation is in a range of 19 to 26 lbs/hr.

* * * * *